(12) United States Patent
Hu et al.

(10) Patent No.: US 11,681,156 B2
(45) Date of Patent: Jun. 20, 2023

(54) OPTICAL ELEMENT DRIVING MECHANISM

(71) Applicant: TDK TAIWAN CORP., Taoyuan (TW)

(72) Inventors: Chao-Chang Hu, Taoyuan (TW); Sung-Mao Tsai, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 250 days.

(21) Appl. No.: 17/088,101

(22) Filed: Nov. 3, 2020

(65) Prior Publication Data

US 2021/0397016 A1 Dec. 23, 2021

Related U.S. Application Data

(60) Provisional application No. 63/041,459, filed on Jun. 19, 2020.

(30) Foreign Application Priority Data

Oct. 9, 2020 (CN) .......................... 202022234762.1

(51) Int. Cl.
  *G02B 27/64* (2006.01)
  *G02B 13/00* (2006.01)
  *G02B 7/18* (2021.01)
(52) U.S. Cl.
  CPC .............. *G02B 27/646* (2013.01); *G02B 7/18* (2013.01); *G02B 13/0065* (2013.01)

(58) Field of Classification Search
  CPC ..... G02B 27/646; G02B 7/18; G02B 13/0065; G02B 7/08; G02B 7/09; G03B 5/00; G03B 13/36
  See application file for complete search history.

(56) References Cited

U.S. PATENT DOCUMENTS

2017/0153409 A1* 6/2017 Chan ....................... G02B 7/04

FOREIGN PATENT DOCUMENTS

CN 211698336 U 10/2020

OTHER PUBLICATIONS

Office Action of CN Application No. 202022234762.1, dated Mar. 11, 2021, 1 page.

* cited by examiner

*Primary Examiner* — Robert E. Tallman
(74) *Attorney, Agent, or Firm* — Muncy, Geissler, Olds & Lowe, P.C.

(57) ABSTRACT

An optical element driving mechanism is provided, including a fixed part, a movable part, a first driving assembly and a first supporting assembly. The movable part is connected to an optical element, and is movable relative to the fixed part. The first driving assembly drives the movable part to move relative to the fixed part. The movable part is movable relative to the fixed part within a first limit range in a first dimension via the first supporting assembly.

20 Claims, 13 Drawing Sheets

OPTICAL ELEMENT DRIVING MECHANISM

CROSS-REFERENCE TO RELATED APPLICATIONS

The present application claims priority of U.S. Provisional Patent Application No. 63/041,459 filed on Jun. 19, 2020 and China Patent Application No. 202022234762.1 filed on Oct. 9, 2020, the entirety of which are incorporated by reference herein.

BACKGROUND OF THE DISCLOSURE

Field of the Disclosure

The present disclosure relates to an optical element driving mechanism, and more particularly to an optical element driving mechanism of an electrical device.

Description of the Related Art

As the relevant technologies have developed, many electronic devices (such as cameras and smartphones) may record images and videos. However, when a lens having a long focal length is provided in an electronic device, the thickness thereof may be increased, impeding the prospects for miniaturization of the electronic device. Therefore, how to design a lens that may see far and has a large amount of light and maintain the lightness and thinness of the electronic device has become an important issue.

BRIEF SUMMARY OF THE DISCLOSURE

To solve the problems of the prior art, an optical element driving mechanism, comprising a fixed part; a movable part, connected to an optical element, and movable relative to the fixed part; a first driving assembly, driving the movable part to move relative to the fixed part; and a first supporting assembly. The movable part being movable relative to the fixed part within a first limit range in a first dimension via the first supporting assembly.

In one of the embodiments of the present disclosure, the optical element changes a traveling direction of an optical axis of a light from a first direction to a second direction. The first direction is not parallel to the second direction. The first dimension is a rotation about a first rotary axis. The first supporting assembly comprises a first intermediate element, located between the fixed part and the movable part; a second intermediate element, located between the fixed part and the movable part; a third intermediate element, located between the fixed part and the movable part; a fourth intermediate element, located between the fixed part and the movable part; a first supporting element, in direct contact with the first intermediate element, and comprising a first base bottom; a first bearing unit, corresponding to the first intermediate element, and comprising a first opening; a first strengthening unit, disposed on the first base bottom, and comprising a second surface; a first accommodating unit, disposed on the first base bottom, and comprising a third surface; a second supporting element, in direct contact with the first intermediate element, and comprising a second base bottom; a second strengthening unit, disposed on the first base bottom, and comprising a fifth surface; and a second accommodating unit, disposed on the first base bottom, and comprising a sixth surface. The first intermediate element has a metal material. The first intermediate element has a spherical structure. The fixed part or the movable part is movable relative to the first intermediate element. The first rotary axis passes through the first intermediate element. The second intermediate element has metal material. The second intermediate element has a spherical structure. The fixed part or the movable part is movable relative to the second intermediate element. The second intermediate element is movable relative to the first intermediate element. The second intermediate element is movable relative to the fixed part. The second intermediate element is movable relative to the movable part. A shortest distance between the second intermediate element and the first rotary axis is different from a shortest distance between the first intermediate element and the first rotary axis. The shortest distance between the second intermediate element and the first rotary axis is greater than the shortest distance between the first intermediate element and the first rotary axis. The fixed part or the movable part is movable relative to the third intermediate element. The third intermediate element is movable relative to the first intermediate element. A shortest distance between the third intermediate element and the first rotary axis is different from the shortest distance between the first intermediate element and the first rotary axis. The shortest distance between the third intermediate element and the first rotary axis is greater than the shortest distance between the first intermediate element and the first rotary axis. The shortest distance between the third intermediate element and the first rotary axis is substantially equal to the shortest distance between the second intermediate element and the first rotary axis. The fixed part or the movable part is movable relative to the fourth intermediate element. The fourth intermediate element is movable relative to the first intermediate element. A shortest distance between the fourth intermediate element and the first rotary axis is different from the shortest distance between the first intermediate element and the first rotary axis. The shortest distance between the fourth intermediate element and the first rotary axis is greater than the shortest distance between the first intermediate element and the first rotary axis. The shortest distance between the fourth intermediate element and the first rotary axis is substantially equal to the shortest distance between the second intermediate element and the first rotary axis. The first rotary axis passes through a triangle formed by the second intermediate element, the third intermediate element and the fourth intermediate element when viewed along the first rotary axis. A first imaginary plane passing through the second intermediate element, the third intermediate element and the fourth intermediate element. The first imaginary plane passes through the first intermediate element. In the direction that is parallel to the second rotary axis, a distance between a center of the fourth intermediate element and a central of the third intermediate element is about zero. The first supporting element is in direct contact with the second intermediate element. The first base bottom has a first surface, and the first surface overlaps and is parallel to a second imaginary plane. The first surface faces toward the first intermediate element. The first base bottom has a plastic material. The first opening accommodates at least part of the first intermediate element. An edge of the first opening has a first reinforcing structure, the first reinforcing structure is in direct contact with the first intermediate element. The first reinforcing structure has an arc structure or an inclined structure that is not parallel and not perpendicular to the first surface. The first bearing unit protrudes from the first surface. The first intermediate element is fixedly connected to the first bearing unit. The second surface faces toward the second intermediate element. The Young's modulus of the first strengthening unit is different from the Young's modulus of the first base bottom. The first strengthening unit has a metal material. The second surface is parallel to the second imaginary plane. The second surface overlaps the second imaginary plane. The second intermediate element does not overlap the second surface when viewed along the direction that is perpendicular to the first rotary axis. The second intermediate element at least partially overlaps the second surface when viewed along the direction that is parallel to the first rotary axis. A non-zero distance is provided between the second intermediate element and the second surface. The third surface faces toward the second intermediate element. The Young's modulus of the first accommodating unit is different from the Young's modulus of the first base bottom. The first accommodating unit has a metal material. The first accommodating unit has a second opening for receiving at least part of the second intermediate element. The second opening does not accommodate the third intermediate element and the fourth intermediate element. The second opening is located on the third surface. An edge of the second opening has a second reinforcing structure, and the second reinforcing structure is in direct contact with the second intermediate element. The second reinforcing structure has an arc structure or an inclined structure that is not parallel and not perpendicular to the third surface. The second intermediate element at least partially overlaps the third surface when viewed along the direction that is perpendicular to the first rotary axis. The second intermediate element at least partially overlaps the third surface when viewed along the direction that is parallel to the first rotary axis. The second supporting element is in direct contact with the second intermediate element. The first intermediate element is located between the first supporting element and the second supporting element when viewed along the direction that is perpendicular to the first rotary axis. The second intermediate element is located between the first supporting element and the second supporting element when viewed along the direction that is perpendicular to the first rotary axis.

In one of the embodiments of the present disclosure, the second base bottom has a fourth surface that is parallel to a third imaginary plane. The direction in which the fourth surface faces is the same as the direction in which the first surface faces. The second base bottom further comprises a first accommodating portion to receive at least part of the second intermediate element. The first accommodating portion does not directly contact the second intermediate element. The second base bottom further comprises a second accommodating portion to receive at least a portion of the second intermediate element. The second accommodating portion does not directly contact the second intermediate element. The second base bottom has a plastic material. The fifth surface faces toward the second intermediate element. The Young's modulus of the second strengthening unit is different from the Young's modulus of the second base bottom. The second strengthening unit further comprises second bearing unit for accommodating at least part of the first intermediate element. The second bearing unit accommodates at least part of the first intermediate element. The second bearing unit has a recessed structure. The first intermediate element is movable relative to the second bearing unit. The second bearing unit is located on the fifth surface. The first intermediate element at least partially overlaps the fifth surface when viewed along the direction that is perpendicular to the first rotary axis. The first intermediate element at least partially overlaps the fifth surface when viewed along the direction that is parallel to the first rotary axis. The second intermediate element does not overlap the fifth surface when viewed along the direction that is perpendicular to the first rotary axis. The second intermediate element at least partially overlaps the fifth surface when viewed along the direction that is parallel to the first rotary axis. A non-zero distance is provided between the second intermediate element and the second surface. The sixth surface faces toward the second intermediate element. The second accommodating unit is disposed on the fourth surface. The Young's modulus of the second accommodating unit is different from the Young's modulus of the first base bottom. The second accommodating unit has a metal material. The second accommodating unit has a third opening for receiving at least part of the second intermediate element. The third opening accommodates at least part of the third intermediate element. The third opening accommodates at least part of the fourth intermediate element. The third opening is located on the sixth surface. An edge of the third opening has a third reinforcing structure, and the third reinforcing structure is in direct contact with the second intermediate element. The third reinforcing structure has an arc structure or an inclined structure that is not parallel and not perpendicular to the sixth surface. The second intermediate element at least partially overlaps the sixth surface when viewed along the direction that is perpendicular to the first rotary axis. The second intermediate element at least partially overlaps the sixth surface when viewed along the direction that is parallel to the first rotary axis.

In one of the embodiments of the present disclosure, the optical element driving mechanism further comprising a first suppression assembly, suppressing an abnormal movement or vibration of the movable part relative to the fixed part to improve the driving accuracy, and the first suppression assembly comprising a first suppression element; a second suppression element, corresponding to the first suppression element; and a first damping element, disposed between the first damping element and the second damping element. The Young's modulus of the first suppression element is different from the Young's modulus of the second suppression element. The first suppression element has a metal material. The second suppression element has a plastic material. The first suppression element and the second suppression element are respectively disposed on the movable part and the fixed part. The first suppression element has a protruding structure extending toward the second suppression element. The second suppression element has recessed structure accommodating at least part of the first suppression element. The first damping element has a soft resin material. In an extending direction of the protruding structure of the first suppression element, a maximum dimension of the first suppression element is smaller than a depth of the recessed structure of the second damping element. The first damping element is in direct contact with the first suppression element and the second suppression element. The first suppression element does not directly contact the second element suppression when the movable part is located at an arbitrary position within the first limit range. The fixed part has a rectangular structure and the first suppression element is located on a first side of the fixed part when viewed along the extending direction of the protruding structure of the first suppression element. The fixed part has a second side, and the second side is not parallel to the first side when viewed along the extending direction of the protruding structure of the first suppression element. A length of the first side is different from a length of the second side. The length of the first side is shorter than the length of the second side.

In one of the embodiments of the present disclosure, the optical element driving mechanism further comprising a second driving assembly. The movable part comprises a holder and a frame. The second driving assembly drives the holder to move relative to the frame. The protruding structure of the first suppression element extends along the first direction. The first driving assembly is located at the first side when viewed along the first direction. The second driving assembly is located at the second when viewed along the first direction. The first driving assembly comprises a first coil, having a first section; and a first magnetic element, corresponding to the first section to generate a first driving force. The second driving assembly comprises a second coil, having a second section; and a second magnetic element, corresponding to the second section to generate a second driving force. The directions of the first driving force and the second driving force are different. The extending directions of the first section and the second section are parallel to each other. An arranging direction of the first coil and the first magnetic element is different from an arranging direction of the second coil and the second magnetic element. A winding axis of the first coil is not parallel to a winding axis of the second coil.

In one of the embodiments of the present disclosure, the optical element driving mechanism further comprising a second suppression assembly. The movable part comprises a holder and a frame. The second suppression assembly suppresses an abnormal movement or vibration of the holder relative to the frame to improve the driving accuracy. The second suppression assembly comprises a plurality of second damping elements. The second damping elements have a soft resin material. The second damping elements are in direct contact with the holder and the frame. The second damping elements are respectively located at different corners of the fixed part when viewed along a first direction. A fourth imaginary plane passes through the second damping elements. The fourth imaginary plane is perpendicular to the first direction.

In one of the embodiments of the present disclosure, the optical element driving mechanism further comprising a second supporting assembly. The movable part comprises a holder and a frame. The holder is movable relative to the frame within the second limit range in the second dimension via the second supporting assembly. The first dimension is different from the second dimension. The second dimension is a rotation about a second rotary axis. The first rotary axis is not parallel to the second rotary axis. The second supporting assembly has a plurality of second supporting units, and the second supporting units are arranged in a direction that is parallel to an extending direction of the second side.

In one of the embodiments of the present disclosure, the optical element driving mechanism further comprising a first connecting assembly. The movable part comprises a frame. The first connecting assembly comprises: a first elastic element, having a plate-like structure; and a second elastic element, having a plate-like structure. The frame is movably connected to the fixed part via the first connecting assembly. A thickness direction of the first elastic element is perpendicular to a third direction. The first elastic element is parallel to the first rotary axis. The first elastic element comprises a plurality of first elastic units, and the first elastic units are arranged along a fourth direction. The second side is parallel to the fourth direction. A thickness direction of the second elastic element is perpendicular to the third direction. The second elastic element is parallel to the first rotary axis. The second elastic element further comprises a plurality of second elastic units, and second elastic units are arranged along the fourth direction. In the third direction, a non-zero distance is provided between the first elastic element and the second elastic element.

In one of the embodiments of the present disclosure, the optical element driving mechanism further comprising a second connecting assembly. The holder is movably connected to the frame via the second connecting assembly, and the second connecting assembly comprises a third elastic element, having a plate-like structure. A thickness direction of the third elastic element is perpendicular to a fifth direction. The third elastic element is not parallel to the first rotary axis. The third elastic element is perpendicular to the first rotary axis. The third elastic element further comprises a plurality of third elastic units, and the third elastic units are arranged along the fourth direction.

In one of the embodiments of the present disclosure, the third elastic element is located between the first elastic element and the second elastic element when viewed along the first direction.

BRIEF DESCRIPTION OF THE DRAWINGS

The disclosure may be more fully understood by reading the subsequent detailed description and examples with references made to the accompanying drawings, wherein.

DETAILED DESCRIPTION OF THE DISCLOSURE

The making and using of optical element driving mechanisms of embodiments of the present disclosure are discussed in detail below. It should be appreciated, however, that the embodiments provide many applicable inventive concepts that may be embodied in a wide variety of specific contexts. The specific embodiments discussed are merely illustrative of specific ways to make and use the embodiments and do not limit the scope of the disclosure.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
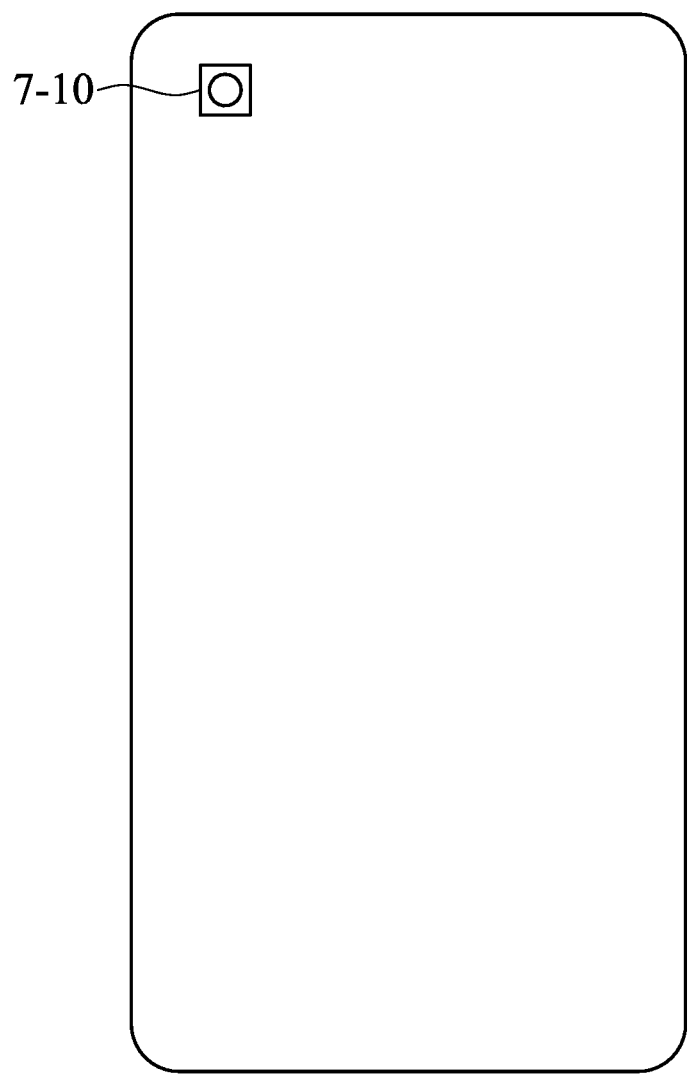
FIG. 1 shows a schematic view of an electrical device with an optical element driving mechanism according to an embodiment of the present disclosure.

Firstly, please refer to FIG. 1, an optical element driving mechanism 7-10 of an embodiment of the present disclosure may be mounted in an electrical device 7-1 for taking photos or videos, wherein the aforementioned electrical device 7-1 may, for example, be a smartphone or a digital camera, but the present disclosure is not limited to these. It should be noted that the position and the size between the optical element driving mechanism 7-10 and the electrical device 7-1 shown in FIG. 1 are only an example, which is not for limiting the position and the size between the optical element driving mechanism 7-10 and the electrical device 7-1. In fact, according to different needs, the optical element driving mechanism 7-10 may be mounted at different positions in the electrical device 7-1.

Figure 2:
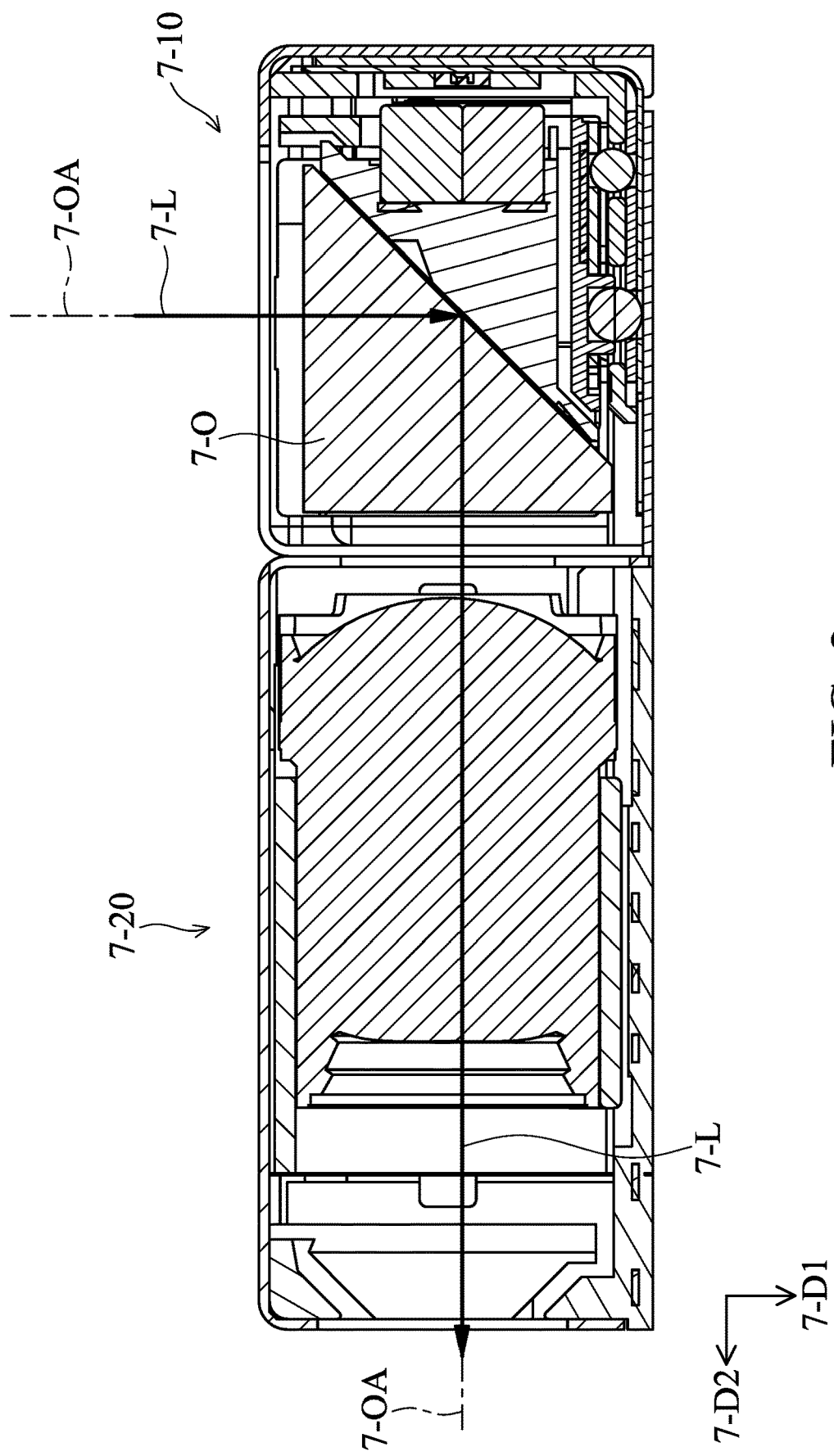
FIG. 2 shows a schematic view of the optical element driving mechanism and a lens module according to an embodiment of the present disclosure.

Please refer to FIG. 2, the optical element driving mechanism 7-10 carries an optical element 7-O. A lens module 7-20 may be disposed outside of the optical element driving mechanism 7-10. The lens module 7-20 is located at the downstream of the light entry of the optical element driving mechanism 7-10. An optical axis 7-OA of a light 7-L incident to the optical element 7-O of the optical element driving mechanism 7-10 along a first direction 7-D1, and then reflected by the optical element 7-O to pass through the lens module 7-20 along a second direction 7-D2 that is not parallel to (or perpendicular to) the first direction 7-D1 for imaging.

Figure 3:
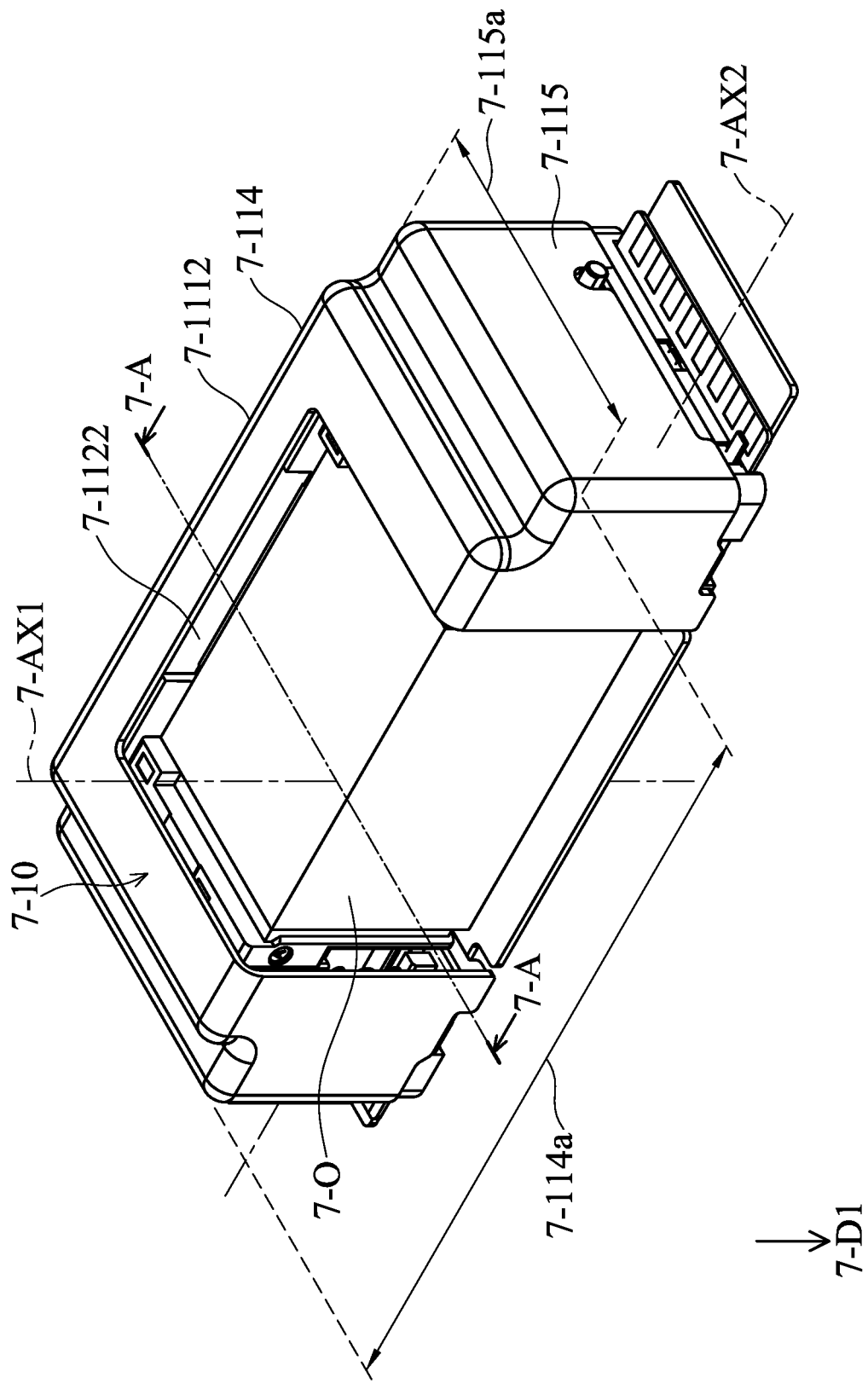
FIG. 3 shows a perspective view of the optical element driving mechanism and an optical element according to an embodiment of the present disclosure.
Figure 4:
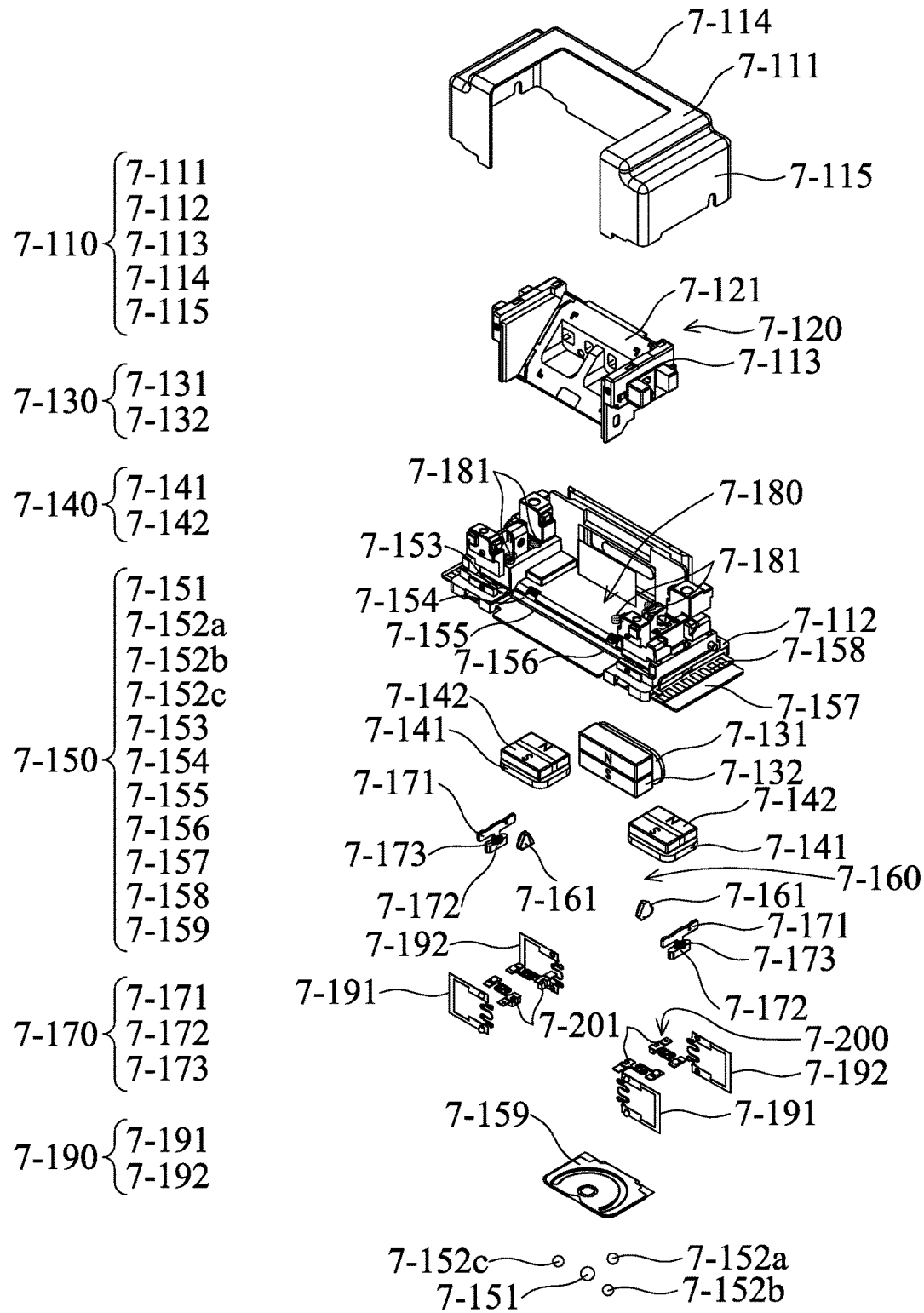
FIG. 4 shows an exploded view of the optical element driving mechanism according to an embodiment of the present disclosure.

Please refer to FIG. 3 and FIG. 4, the optical element driving mechanism 7-10 includes a fixed part 7-110, a movable part 7-120, a first driving assembly 7-130, a second driving assembly 7-140, a first supporting assembly 7-150, a second supporting assembly 7-160, a first suppression assembly 7-170, a second suppression assembly 7-180, a first connecting assembly 7-190 and a second connecting assembly 7-200.

The movable part 7-120 is movable relative to the fixed part 7-110 within a first limit range in a first dimension via the first supporting assembly 7-150. In which, the first dimension is a rotation about a first rotary axis 7-AX1. The movable part 7-120 is movable relative to the fixed part 7-110 within a second limit range in a second dimension via the second supporting assembly 7-160. In which, the second dimension is a rotation about a second rotary axis 7-AX2.

The first rotary axis 7-AX1 are not parallel to the second rotary axis 7-AX2. Thus, the first dimension is different from the second dimension.

Please continue to refer to FIG. 3 and FIG. 4, the fixed part 7-110 includes an outer frame 7-111, a base 7-112, a frame 7-113, a first side 7-114 and a second side 7-115. The movable part 7-120 includes a holder 7-121. The first driving assembly 7-130 includes a first coil 7-131 and a first magnetic element 7-132. The second driving assembly 7-140 includes a second coil 7-141 and a second magnetic element 7-142. The first supporting assembly 7-150 includes a first intermediate element 7-151, a second intermediate element 7-152a, a third intermediate element 7-152b, a fourth intermediate element 7-152c, a first supporting element 7-153, a first bearing unit 7-154, a first strengthening unit 7-155, a first accommodating unit 7-156, a second supporting element 7-157, a second strengthening unit 7-158, and a second accommodating unit 7-159. The second supporting assembly 7-160 includes a plurality of second supporting units 7-161. The first suppression assembly 7-170 includes a first suppression element 7-171, a second suppression element 7-172, and a first damping element 7-173. The second suppression assembly 7-180 includes a plurality of second damping elements 7-181. The first connecting assembly 7-190 includes a first elastic element 7-191 and a second elastic element 7-192. The second connecting assembly 7-200 includes a third elastic element 7-201.

Figure 5:
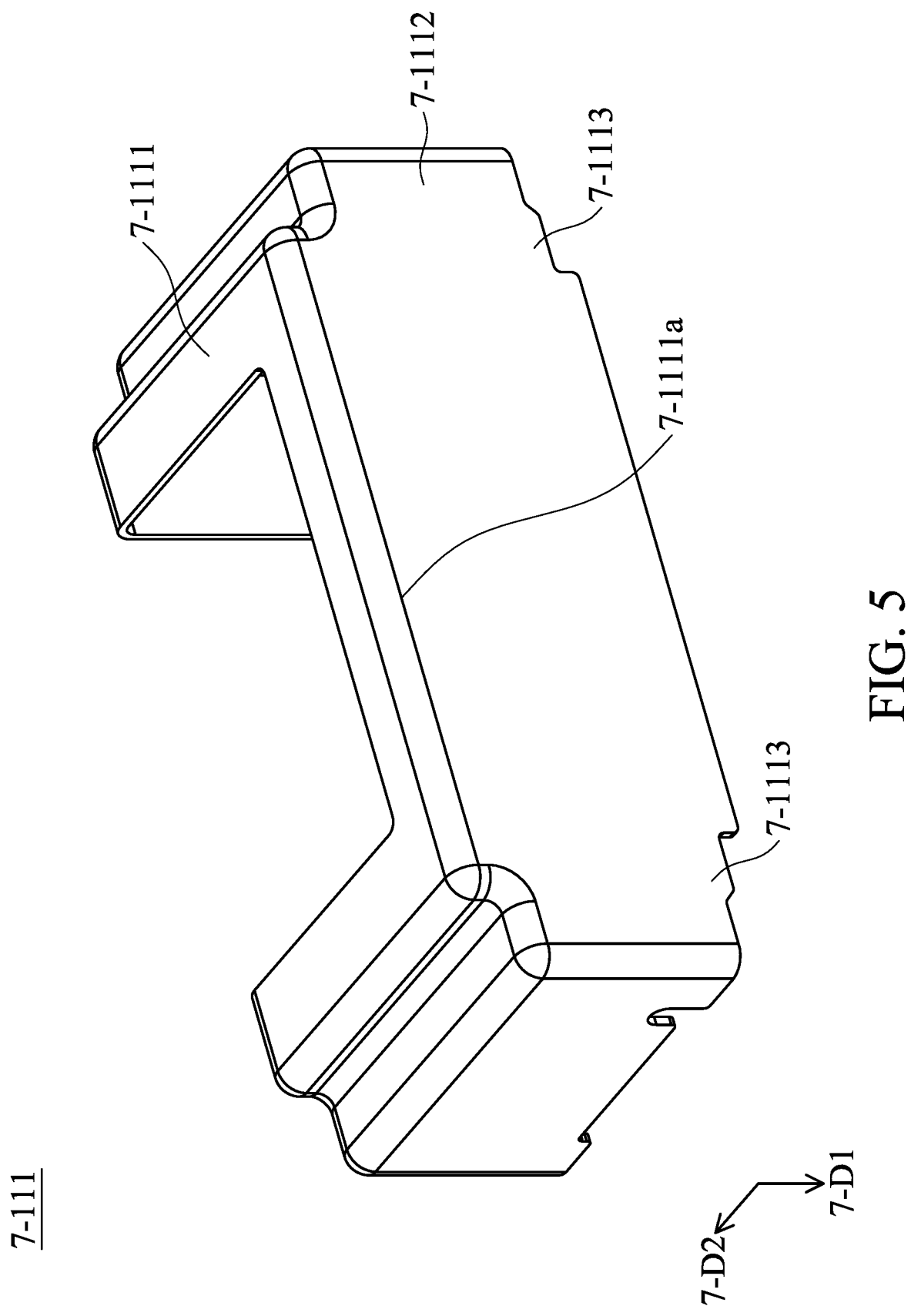
FIG. 5 shows a perspective view of an outer frame of the optical element driving mechanism according to an embodiment of the present disclosure.

Please refer to FIG. 5, the outer frame 7-111 of the fixed part 7-110 includes a top surface 7-1111, an outer frame sidewall 7-1112 and two outer frame connecting portions 7-1113. The top surface 7-1111 is not parallel to the first direction 7-D1. The outer frame sidewall 7-1112 is parallel to the first direction 7-D1, and the outer frame sidewall 7-1112 extends from an edge 7-1111a of the top surface 7-1111. The outer frame sidewall 7-1112 is located at the first side 7-114 of the fixed part 7-110 (FIG. 3). The outer frame connecting portions 7-1113 has a plate-like structure, and the outer frame connecting portions 7-1113 is located at outside the outer frame sidewall 7-1112.

Figure 6:
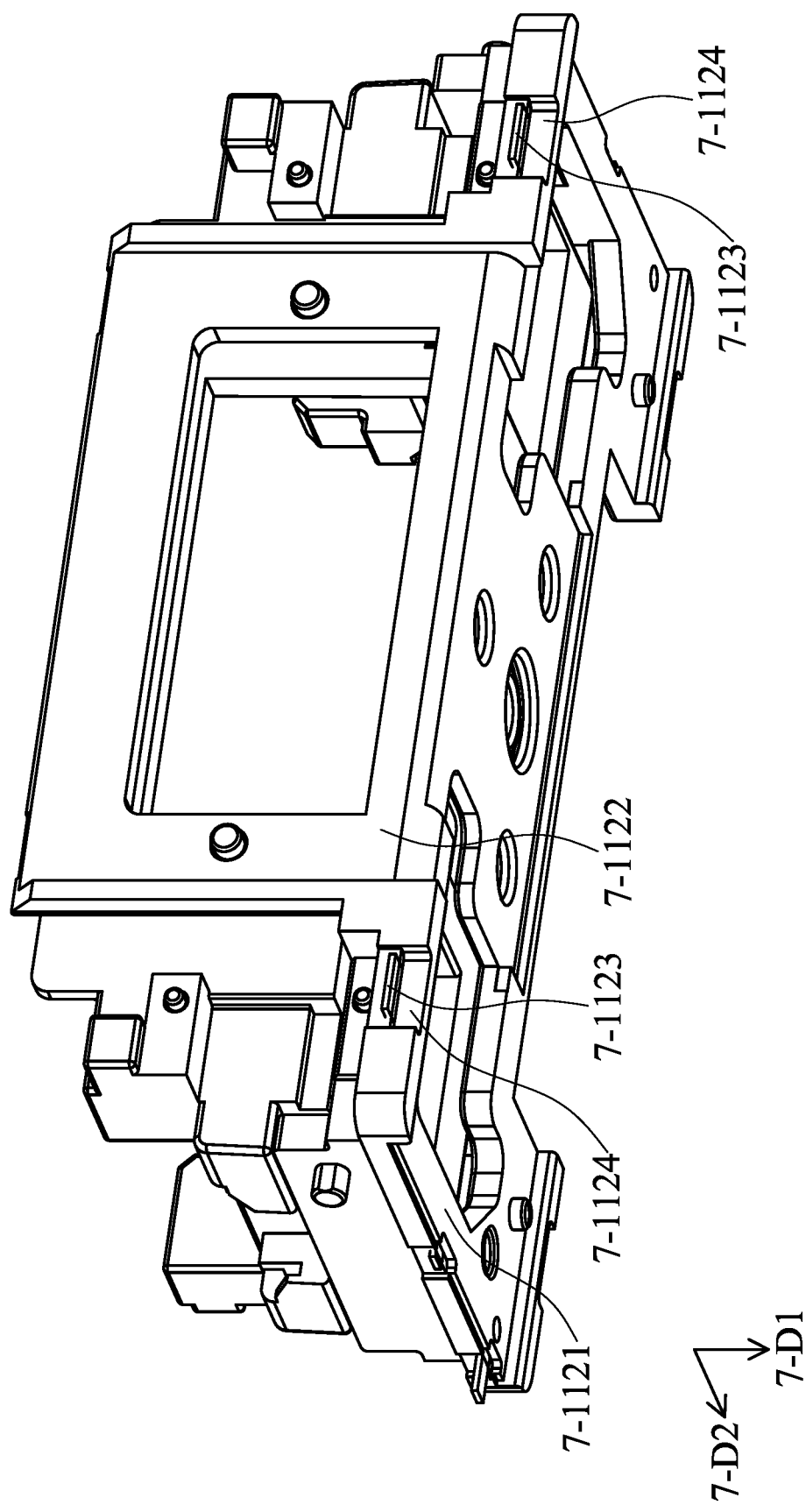
FIG. 6 shows a perspective view of a base of the optical element driving mechanism according to an embodiment of the present disclosure.
Figure 7:
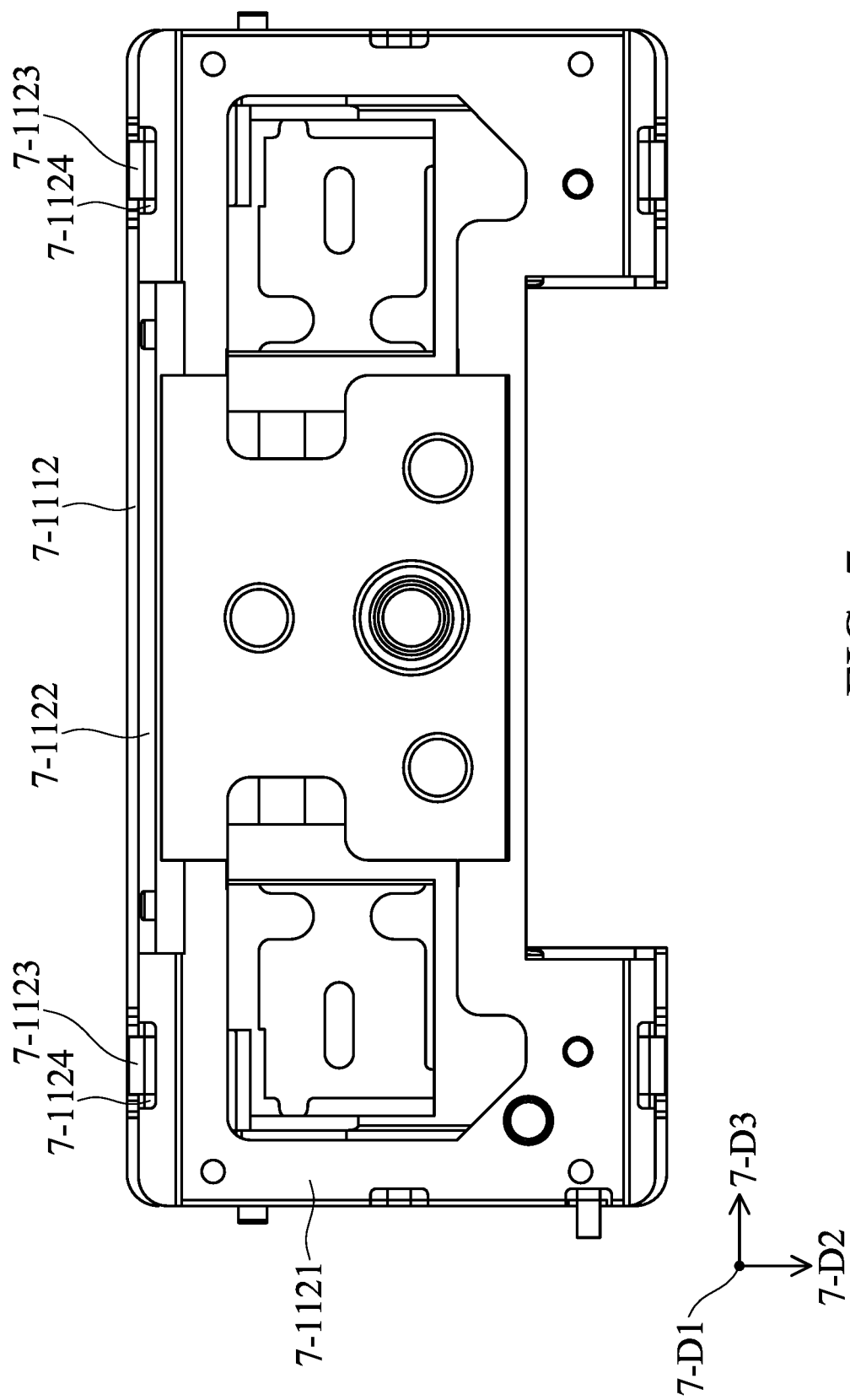
FIG. 7 shows a bottom view of the outer frame and base of the optical element driving mechanism according to an embodiment of the present disclosure.

Please refer to FIG. 6 and FIG. 7, the base 7-112 of the fixed part 7-110 includes a bottom plate 7-1121, a first base sidewall 7-1122, two base connecting portions 7-1123, and two base connecting portion recesses 7-1124. The bottom plate 7-1121 of the fixed part 7-110 is not parallel to the first direction 7-D1, and the bottom plate 7-1121 has a plastic material. The first base sidewall 7-1122 is parallel to the first direction 7-D1 and extends from the bottom plate 7-1121. The first base sidewall 7-1122 is located on the first side 7-114 of the fixed part 7-110 (FIG. 3). Since the outer frame sidewall 7-1112 is also parallel to the first direction 7-D1, therefore, the first base sidewall 7-1122 is parallel to the outer frame sidewall 7-1112. The first base sidewall 7-1122 is closer to the movable part 7-120 (not shown in FIG. 6 and FIG. 7) than the outer frame sidewall 7-1112 when viewed along the first direction 7-D1.

Figure 8:
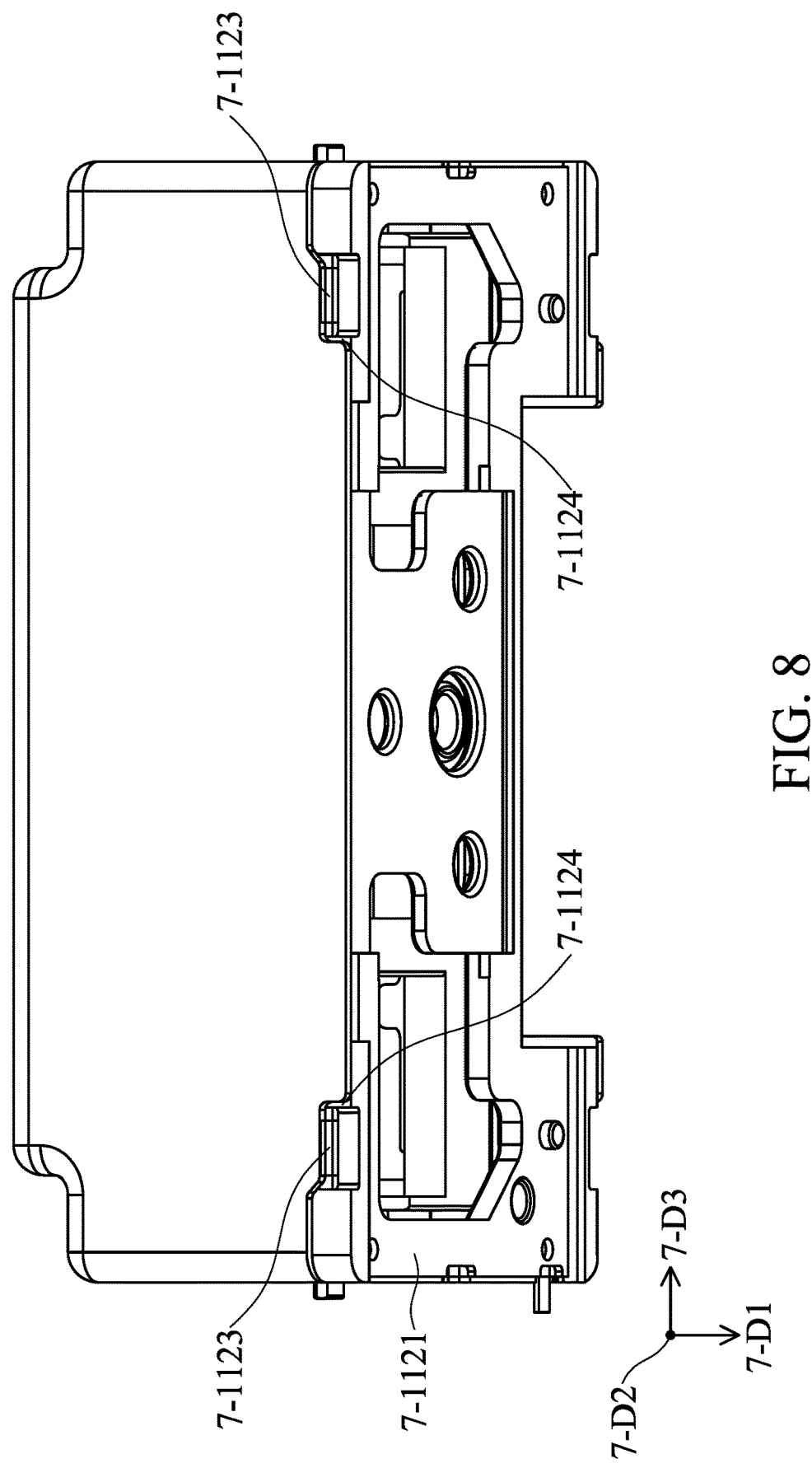
FIG. 8 shows a perspective view of the outer frame and the base of the optical element driving mechanism according to an embodiment of the present disclosure.

Please refer to FIG. 7 and FIG. 8, the base connecting portion 7-1123 has a plate-like structure. The base connecting portion 7-1123 is located on the bottom plate 7-1121, and the base connecting portion 7-1123 is at least partially embedded in the bottom plate 7-1121. The base connecting portion 7-1123 is disposed in the base connecting portion recess 7-1124. The base connecting portion 7-1123 is revealed to the base connecting portion recess 7-1124 when viewed along a third direction 7-D3 that is perpendicular to the first direction 7-D1 and the second direction 7-D2. The outer frame connecting portion 7-1113 covers the base connecting portion 7-1123 when viewed along the first direction 7-D1. In one embodiment, the outer frame connecting portion 7-1113 is fixedly connected to the base connecting portion 7-1123, and the outer frame connecting portion 7-1113 is not parallel to the base connecting portion 7-1123. In one embodiment, the outer frame connecting portion 7-1113 is perpendicular to the base connecting portion 7-1123, and the outer frame connecting portion 7-1113 is fixedly connected to the s base connecting portion 7-1123 by welding. Thus, the structure of the optical element driving mechanism 7-10 may be strengthened.

Figure 9:
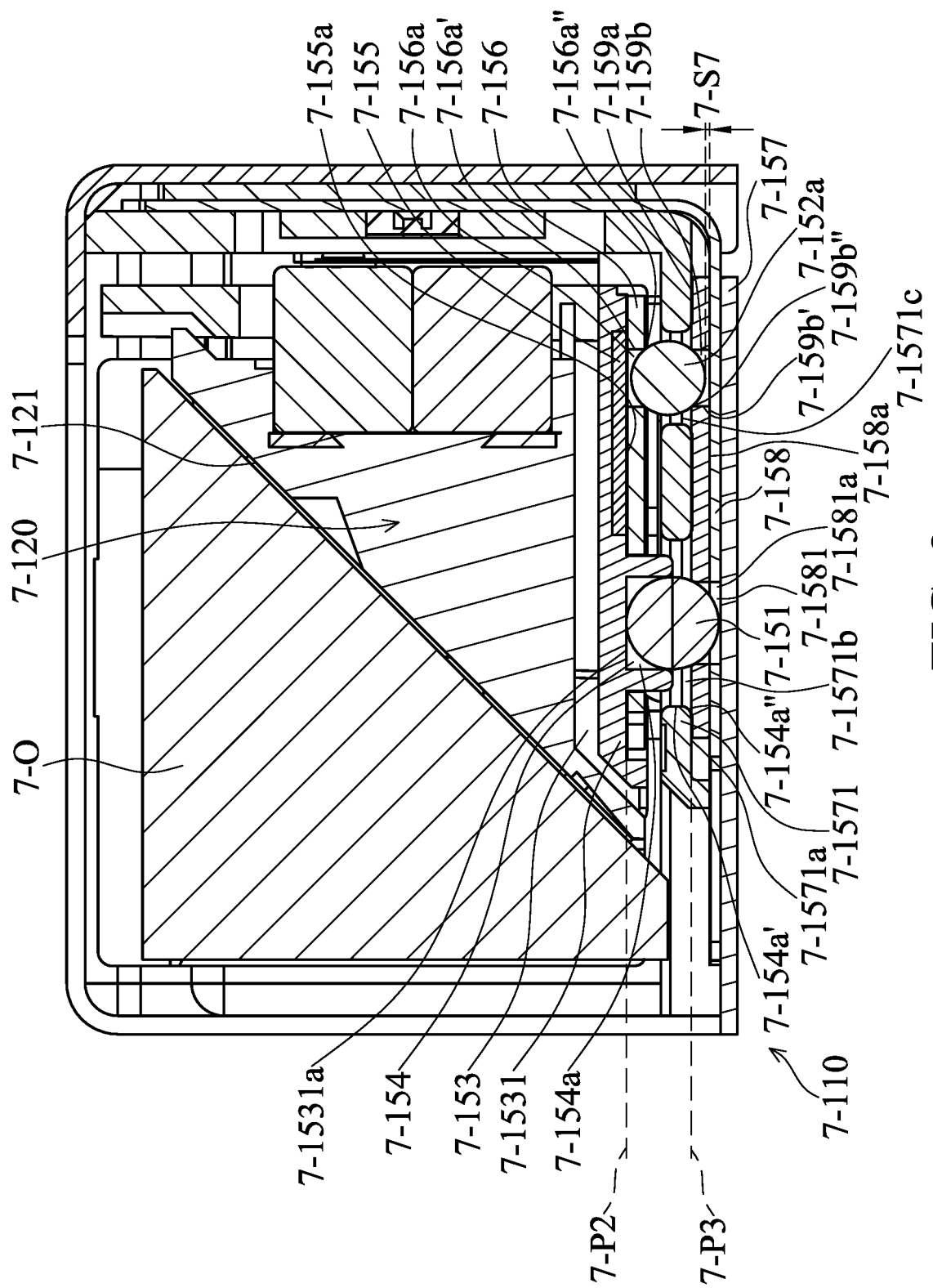
FIG. 9 shows a cross-sectional view of the optical element driving mechanism and the optical element along line 7-A-7-A of FIG. 3, according to an embodiment of the present disclosure.

Please refer to FIG. 9, the movable part 7-120 is in contact with and is connected to the optical element 7-O, and the movable part 7-120 is movable relative to the fixed part 7-110. Specifically, the holder 7-121 of the movable part 7-120 carries and is connected to the optical element 7-O. The holder 7-121 may have any shape that is suitable for carry and be connected to the optical element 7-O. For example, the holder 7-121 may have at least one recess (may refer to FIG. 4).

Figure 10:
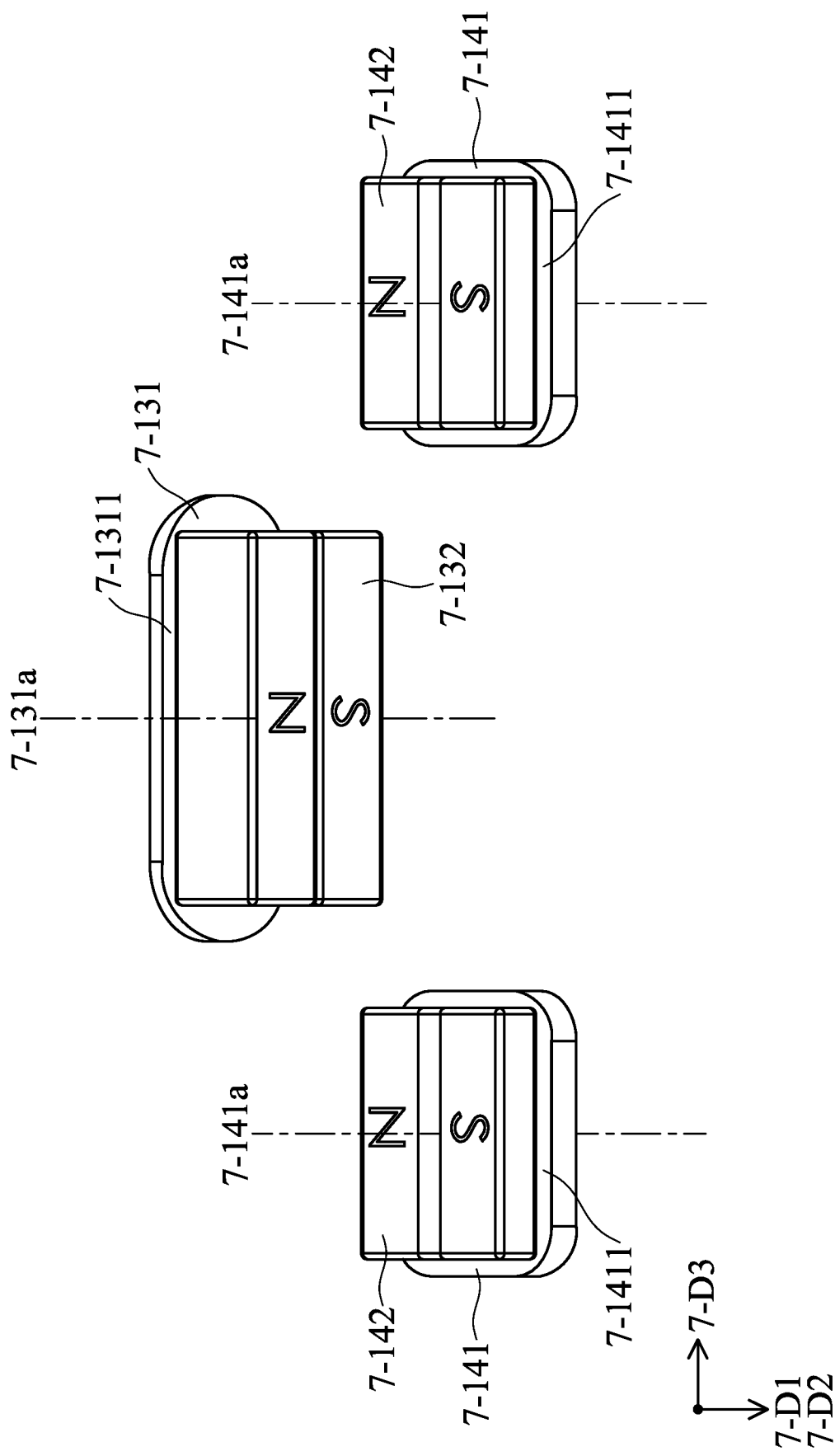
FIG. 10 shows a perspective view of a first driving assembly and a second driving assembly of the optical element driving mechanism according to an embodiment of the present disclosure.

Please refer to FIG. 10, the first driving assembly 7-130 drives the movable part 7-120 to move relative to the fixed part 7-110. The first driving assembly 7-130 is located at the first side 7-114 (not shown in FIG. 10) when viewed along the first direction 7-D1. The first coil 7-131 of the first driving assembly 7-130 has a first segment 7-1311. The first segment 7-1311 extends along the third direction 7-D3. A winding axis 7-131a of the first coil 7-131 is parallel to the second direction 7-D2. The first coil 7-131 and the first magnetic element 7-132 are arranged along the first direction 7-D1. The first magnetic element 7-132 of the first driving assembly 7-130 corresponds to the first segment 7-1311 to generate a first driving force. The direction of the first driving force is parallel to the first direction 7-D1.

The second driving assembly 7-140 drives the holder 7-121 to move relative to the frame 7-113. The second driving assembly 7-140 is located on the second side 7-115 (not shown in FIG. 10) when viewed along the first direction 7-D1. The second coil 7-141 of the second driving assembly 7-140 has a second section 7-1411. The second section 7-1411 also extends along the third direction 7-D3. Therefore, the extending directions of the first segment 7-1311 and the second segment 7-1411 are parallel to each other. A winding axis 7-141a of the second coil 7-141 is parallel to the first direction 7-D1. Thus, the winding axis 7-131a of the first coil 7-131 is not parallel to the winding axis 7-141a of the second coil 7-141. The second coil 7-141 and the second magnetic element 7-142 are arranged along the second direction 7-D2. Thus, the arranging direction of the first coil 7-131 and the first magnetic element 7-132 is different from the arranging direction of the second coil 7-141 and the second magnetic element 7-142. The second magnetic element 7-142 of the second driving assembly 7-140 corresponds to the second segment 7-1411 to generate a second driving force.

It should be noted that the directions of the aforementioned first driving force and the second driving force are different. The first driving force may drive the movable part 7-120 to move relative to the fixed part 7-110 within the first limit range in the first dimension. Moreover, the second driving force may drive the movable part 7-120 to move relative to the fixed part 7-110 within the second limit range in the second dimension.

Figure 11:
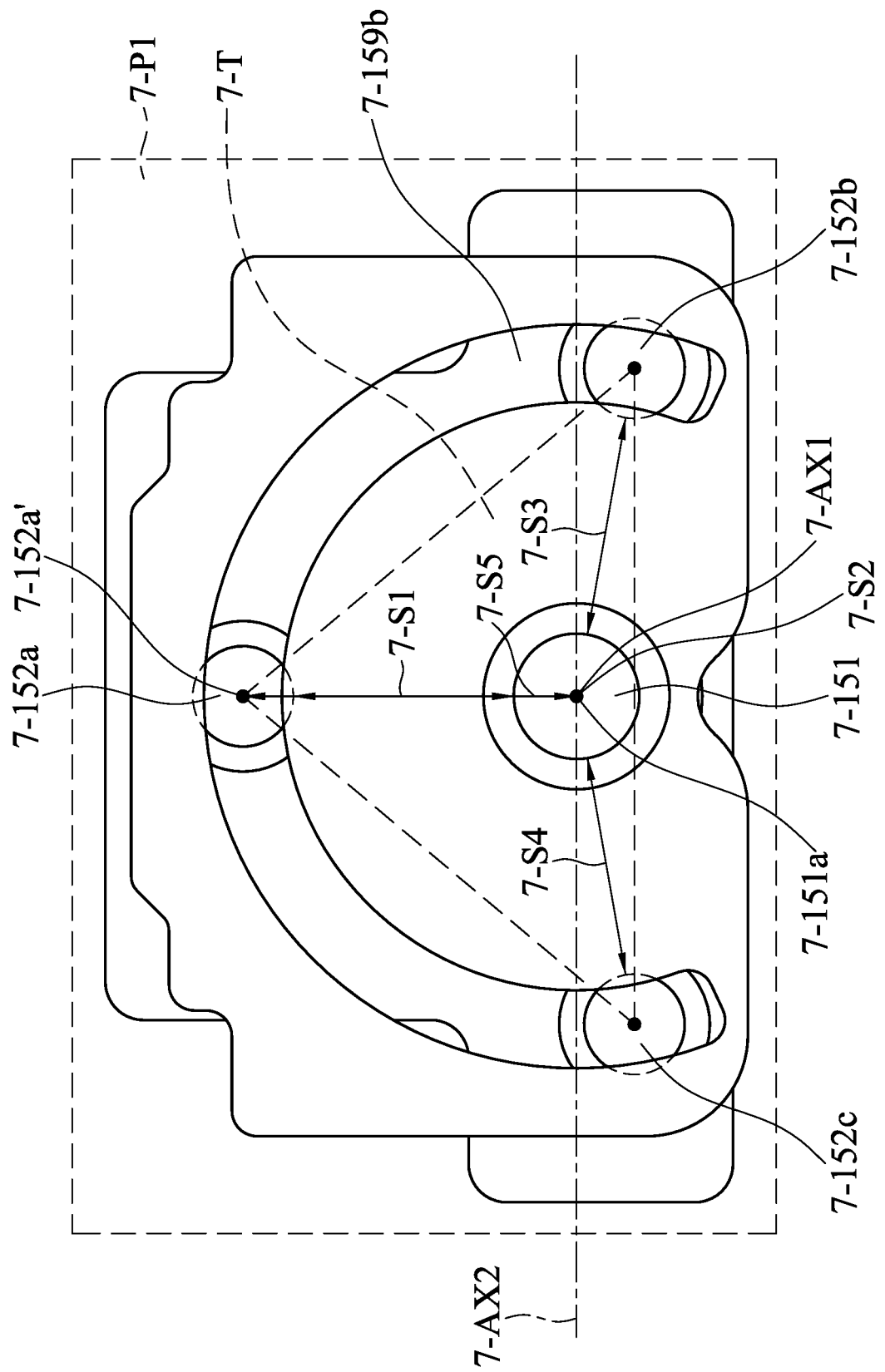
FIG. 11 shows a schematic view of first intermediate element, a second intermediate element, a third intermediate element and a fourth intermediate element of the optical element driving mechanism according to an embodiment of the present disclosure.

Please refer to FIG. 9 and FIG. 11, the first supporting assembly 7-150 of the first intermediate element 7-151, the second intermediate element 7-152a, the third intermediate element 7-152b and the fourth intermediate element 7-152c are located between the fixed part 7-110 and the movable part 7-120.

The first intermediate element 7-151 has a metal material, and the first intermediate element 7-151 has a spherical structure. Therefore, the fixed part 7-110 or the movable part 7-120 is movable relative to the first intermediate element 7-151. The first rotary axis 7-AX1 passes through the first intermediate element 7-151.

The second intermediate element 7-152a has a metal material, and the second intermediate element 7-152a has a spherical structure. The fixed part 7-110 or the movable part 7-120 is movable relative to the second intermediate element 7-152a. The second intermediate element 7-152a is movable relative to the first intermediate element 7-151. The second intermediate element 7-152a is movable relative to the fixed part 7-110, and the second intermediate element 7-152a is movable relative to the movable part 7-120. A shortest distance 7-S1 between the second intermediate element 7-152a and the first rotary axis 7-AX1 is different from a shortest distance 7-S2 between the first intermediate element 7-151 and the first rotary axis 7-AX1. The shortest distance 7-S1 between the second intermediate element 7-152a and the first rotary axis 7-AX1 is greater than the shortest distance 7-S2 between the first intermediate element 7-151 and the first rotary axis 7-AX1.

The third intermediate element 7-152b has a metal material, and the third intermediate element 7-152b has a spherical structure. The fixed part 7-110 or the movable part 7-120 is movable relative to the third intermediate element 7-152b. The third intermediate element 7-152b is movable relative to the first intermediate element 7-151. A shortest distance 7-S3 between the third intermediate element 7-152b and the first rotary axis 7-AX1 is different from the shortest distance 7-S2 between the first intermediate element 7-151 and the first rotary axis 7-AX1. The shortest distance 7-S3 between the third intermediate element 7-152b and the first rotary axis 7-AX1 is greater than the shortest distance 7-S2 between the first intermediate element 7-151 and the first rotary axis 7-AX1. The shortest distance 7-S3 between the third intermediate element 7-152b and the first rotary axis 7-AX1 is substantially equal to the shortest distance 7-S1 between the second intermediate element 7-152a and the first rotary axis 7-AX1.

The fourth intermediate element 7-152c has a metal material, and the fourth intermediate element 7-152c has a spherical structure. The fixed part 7-110 or the movable part 7-120 is movable relative to the fourth intermediate element 7-152c. The fourth intermediate element 7-152c is movable relative to the first intermediate element 7-151. A shortest distance 7-S4 between the fourth intermediate element 7-152c and the first rotary axis 7-AX1 is different from the shortest distance 7-S2 between the first intermediate element 7-151 and the first rotary axis 7-AX1. The shortest distance 7-S4 between the fourth intermediate element 7-152c and the first rotary axis 7-AX1 is greater than the shortest distance 7-S2 between the first intermediate element 7-151 and the first rotary axis 7-AX1. The shortest distance 7-S4 between the fourth intermediate element 7-152c and the first rotary axis 7-AX1 is substantially equal to the shortest distance 7-S1 between the second intermediate element 7-152a and the first rotary axis 7-AX1.

The first rotary axis 7-AX1 passes through a triangle 7-T (shown as a dashed-line) formed by the second intermediate element 7-152a, the third intermediate element 7-152b and the fourth intermediate element 7-152c when viewed along the first rotary axis 7-AX1. In the direction that is parallel to the first rotary axis 7-AX1, a non-zero gap 7-S5 is provided between a center 7-151a of the first intermediate element 7-151 and a center 7-152a' of the second intermediate element 7-152a. In the direction that is parallel to the second rotary axis 7-AX2, a distance between a center 7-152c' of the fourth intermediate element 7-152c and a central 7-152b' of the third intermediate element 7-152b is about zero. A first imaginary plane 7-P1 passes through the first intermediate element 7-151, the second intermediate element 7-152a, the third intermediate element 7-152b, and the fourth intermediate element 7-152c.

Please return to FIG. 9, the first supporting element 7-153 of the first supporting assembly 7-150 is in direct contact with the first intermediate element 7-151, and the first supporting element 7-153 includes a first base bottom 7-1531. The first base bottom 7-1531 has a first surface 7-1531a. The first bearing unit 7-154 corresponds to the first intermediate element 7-151, and the first bearing unit 7-154 includes a first opening 7-154a. The first strengthening unit 7-155 is disposed on the first base bottom 7-1531, and the first strengthening unit 7-155 includes a second surface 7-155a. The first accommodating unit 7-156 is disposed on the first base bottom 7-1531, and the first accommodating unit 7-156 includes a third surface 7-156a. The second supporting element 7-157 is in direct contact with the first intermediate element 7-151, and the second supporting element 7-157 includes a second base bottom 7-1571. The second base bottom 7-1571 has a fourth surface 7-1571a, a first accommodating portion 7-1571b and a second accommodating portion 7-1571c. The second strengthening unit 7-158 is disposed on the first base bottom 7-1531, and the second strengthening unit 7-158 includes a second bearing unit 7-1581 and a fifth surface 7-158a. The second accommodating unit 7-159 is disposed on the first base bottom 7-1531, and the second accommodating unit 7-159 includes a sixth surface 7-159a and a third opening 7-159b.

The first supporting element 7-153 is in direct contact with the second intermediate element 7-152a. The first surface 7-1531a overlaps and is parallel to a second imaginary plane 7-P2. The first surface 7-1531a faces the first intermediate element 7-151. The first base bottom 7-1531 has a plastic material. The first opening 7-154a accommodates at least part of the first intermediate element 7-151. An edge 7-154a' of the first opening 7-154a has a first reinforcing structure 7-154a''. The first reinforcing structure 7-154a'' is in direct contact with the first intermediate element 7-151. The first reinforcing structure 7-154a'' may have an arc structure or an inclined structure that is not parallel and not perpendicular to the first surface 7-1531a, so as to avoid damaging the first intermediate element 7-151.

The first bearing unit 7-154 protrudes from the first surface 7-1531a. The first intermediate element 7-151 is fixedly connected to the first bearing unit 7-154. The second surface 7-155a faces the second intermediate element 7-152a. The Young's modulus of the first strengthening unit 7-155 is different from the Young's modulus of the first base bottom 7-1531. The first strengthening unit 7-155 has a metal material. The second surface 7-155a is parallel to the second imaginary plane 7-P2. The second surface 7-155a overlaps the second imaginary plane 7-P2. The second intermediate element 7-152a does not overlap the second surface 7-155a when viewed along the direction that is perpendicular to the first rotary axis 7-AX1. The second intermediate element 7-152a at least partially overlaps the second surface 7-155a when viewed along the direction that is parallel to the first rotary axis 7-AX1. A non-zero distance 7-S6 is provided between the second intermediate element 7-152a and the second surface 7-155a.

The third surface 7-156a faces the second intermediate element 7-152a. The Young's modulus of the first accommodating unit 7-156 is different from the Young's modulus of the first base bottom 7-1531. The first accommodating unit 7-156 has a metal material. The first accommodating unit 7-156 has a second opening 7-156a to accommodate at least part of the second intermediate element 7-152a. The second opening 7-156a does not accommodate the third intermediate element 7-152b and the fourth intermediate element 7-152c. The second opening 7-156a is located on the third surface 7-156a. An edge 7-156a' of the second opening 7-156a has a second reinforcing structure 7-156a''. The second reinforcing structure 7-156a'' is in direct contact with the second intermediate element 7-152a. The second reinforcing structure 7-156a'' has an arc structure or an inclined structure that is not parallel and not perpendicular to the third surface 7-156a, so as to avoid damaging the second intermediate element 7-152a.

The second intermediate element 7-152a at least partially overlaps the third surface 7-156a when viewed along the direction that is perpendicular to the first rotary axis 7-AX1. The second intermediate element 7-152a at least partially overlaps the third surface 7-156a when viewed along the direction that is parallel to the first rotary axis 7-AX1. The second supporting element 7-157 is in direct contact with the second intermediate element 7-152a. The first intermediate element 7-151 is located between the first supporting element 7-153 and the second supporting element 7-157 when viewed along the direction that is perpendicular to the first rotary axis 7-AX1. The second intermediate element 7-152a is located between the first supporting element 7-153 and the second supporting element 7-157 when viewed along the direction that is perpendicular to the first rotary axis 7-AX1.

The fourth surface 7-1571a overlaps and is parallel to a third imaginary plane 7-P3. The direction in which the fourth surface 7-1571a faces is the same as the direction in which the first surface 7-1531a faces. The first accommodating portion 7-1571b accommodates at least part of the first intermediate element 7-151. The first accommodating portion 7-1571b is not in direct contact with the first intermediate element 7-151. The second accommodating portion 7-1571c accommodates at least part of the second intermediate element. The second accommodating portion 7-1571c is not in direct contact with the second intermediate element 7-152a. The second base bottom 7-1571 has a plastic material.

The fifth surface 7-158a faces the second intermediate element 7-152a. The Young's modulus of the second strengthening unit 7-158 is different from the Young's modulus of the second base bottom 7-1571. The second bearing unit 7-1581 accommodates at least part of the first intermediate element 7-151. The second bearing unit 7-1581 accommodates at least part of the first intermediate element 7-151. The second bearing unit 7-1581 has a recessed structure 7-1581a. The first intermediate element 7-151 is movable relative to the second bearing unit 7-1581. The second bearing unit 7-1581 is located on the fifth surface 7-158a. The first intermediate element 7-151 at least partially overlaps the fifth surface 7-158a when viewed along the direction that is perpendicular to the first rotary axis 7-AX1. The first intermediate element 7-151 at least partially overlaps the fifth surface 7-158a when viewed along the direction that is parallel to the first rotary axis 7-AX1. The second intermediate element 7-152a does not overlap the fifth surface 7-158a when viewed along the direction that is perpendicular to the first rotary axis 7-AX1. Parallel along a first rotary axis 7-AX1 when viewed in the direction of, the second intermediate element 7-152a and the fifth surface 7-158a at least partially overlap. A non-zero gap 7-S7 is provided between the second intermediate element 7-152a and the fifth surface 7-158a.

The sixth surface 7-159a faces the second intermediate element 7-152a. The second accommodating unit 7-159 is disposed on the fourth surface 7-1571a. The Young's modulus of the second accommodating unit 7-159 is different from the Young's modulus of the first base bottom 7-1531. The second accommodating unit 7-159 has a metal material. The third opening 7-159b accommodates at least part of the second intermediate element 7-152a (FIG. 11). The third opening 7-159b accommodates at least part of the third intermediate element 7-152b (FIG. 11). The third opening 7-159b accommodates at least part of the fourth intermediate element 7-152c (FIG. 11). The third opening 7-159b is located on the sixth surface 7-159a. An edge 7-159b' of the third opening 7-159b has a third reinforcing structure 7-159b''. The third reinforcing structure 7-159b'' is in direct contact with the second intermediate element 7-152a. The third reinforcing structure 7-159b'' has an arc structure or an inclined structure that is not parallel and not perpendicular to the sixth surface 7-159a, so as to avoid damaging the second intermediate element 7-152a. The second intermediate element 7-152a at least partially overlaps the sixth surface 7-159a when viewed along the direction that is perpendicular to the first rotary axis 7-AX1. The second intermediate element 7-152a at least partially overlaps the sixth surface 7-159a when viewed along the direction that is parallel to the first rotary axis 7-AX1.

By providing the reinforcing structures, the intermediate elements may be prevented from being damaged, and the optical element drive mechanism is prevented from being adversely affected.

Figure 12:
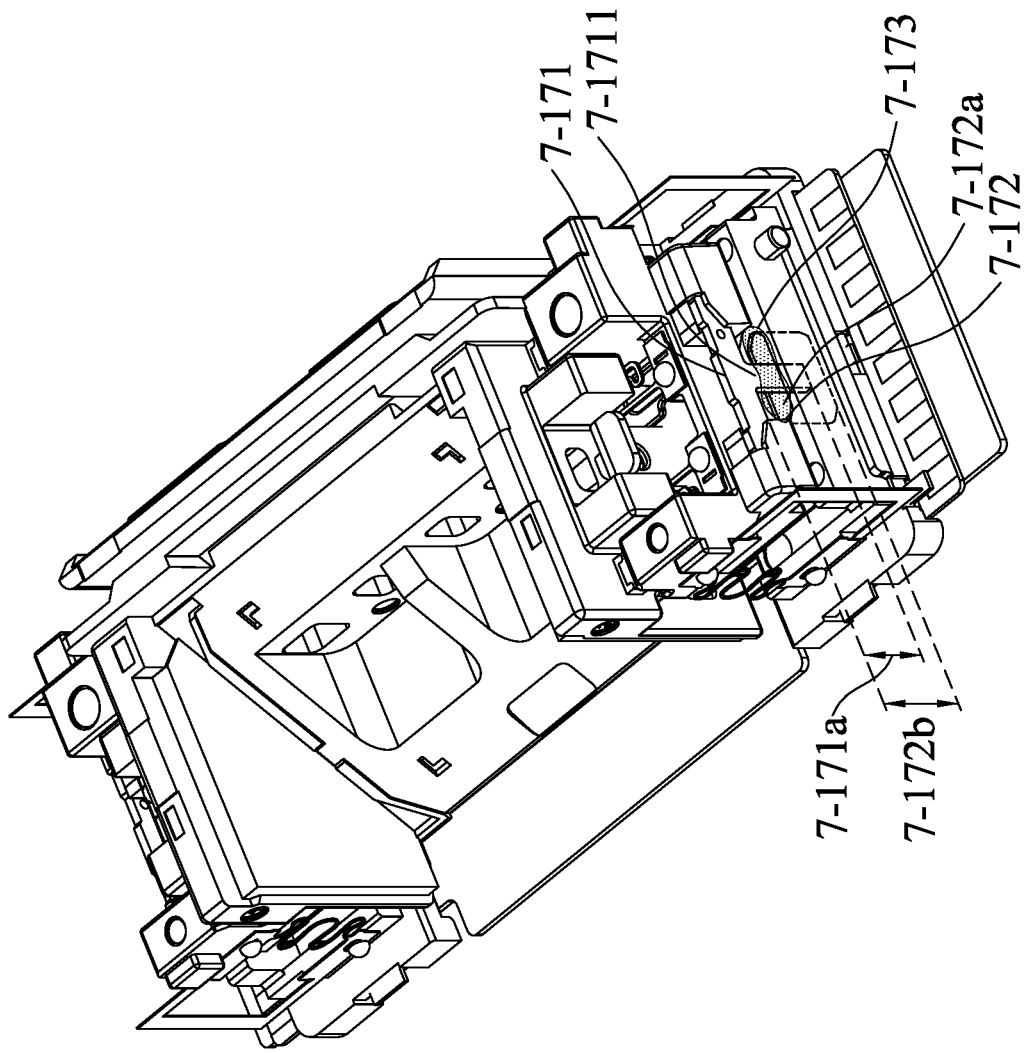
FIG. 12 shows a schematic view of a first suppression assembly of the optical element driving mechanism according to an embodiment of the present disclosure.

Please refer to FIG. 12, the first suppression assembly 7-170 suppresses an abnormal movement or vibration of the movable part 7-120 relative to the fixed part 7-110, so as to improve the driving accuracy. The second suppression element 7-172 corresponds to the first suppression element 7-171. The first damping element 7-173 is provided between the first suppression element 7-171 and the second suppression element 7-172. The Young's modulus of the first suppression element 7-171 is different from the Young's modulus of the second suppression element 7-172. The first suppression element 7-171 has a metal material. The second suppression element 7-172 has a plastic material. The first suppression element 7-171 and the second suppression element 7-172 are respectively disposed on the movable part 7-120 and the fixed part 7-110. The first suppression element 7-171 has a projecting structure 7-1711 extending towards the second suppression element 7-172. The second suppression element 7-172 has a recessed structure 7-172a that accommodates at least part of the first suppression element 7-171. The first damping element 7-173 has a soft resin material. The protruding structure 7-1711 of the first suppression element 7-171 extends along the first direction 7-D1. In an extending direction of the protruding structure 7-1711 of the first suppression element 7-171 (may be the first direction 7-D1), a maximum dimension 7-171a of the first suppression element 7-171 is smaller than a depth 7-172b of the recessed structure 7-172a of the second damping element 7-172. The first damping element 7-173 is in direct contact with the first damping element 7-171 and the second damping element 7-172.

The first suppression element 7-171 does not directly contact the second element suppression 7-172 when the movable part 7-120 is located at an arbitrary position within the first limit range. The fixed part 7-110 has a rectangular structure and the first suppression element 7-171 is located on the first side 7-114 of the fixed part 7-110 when viewed along the extending direction of the protruding structure 7-1711 of the first suppression element 7-171 (may be the first direction 7-D1). The second side 7-115 of the fixed part 7-110 is not parallel to the first side 7-114 when viewed along the extending direction of the protruding structure 7-1711 of the first suppression element 7-171 (may be the first direction 7-D1) (may refer to FIG. 3). A length 7-114a of the first side 7-114 is different from a length 7-115a of the second side 7-115. The length 7-114a of the first side 7-114 is smaller than the length 7-115a of the second side 7-115 (may refer to FIG. 3).

Figure 13:
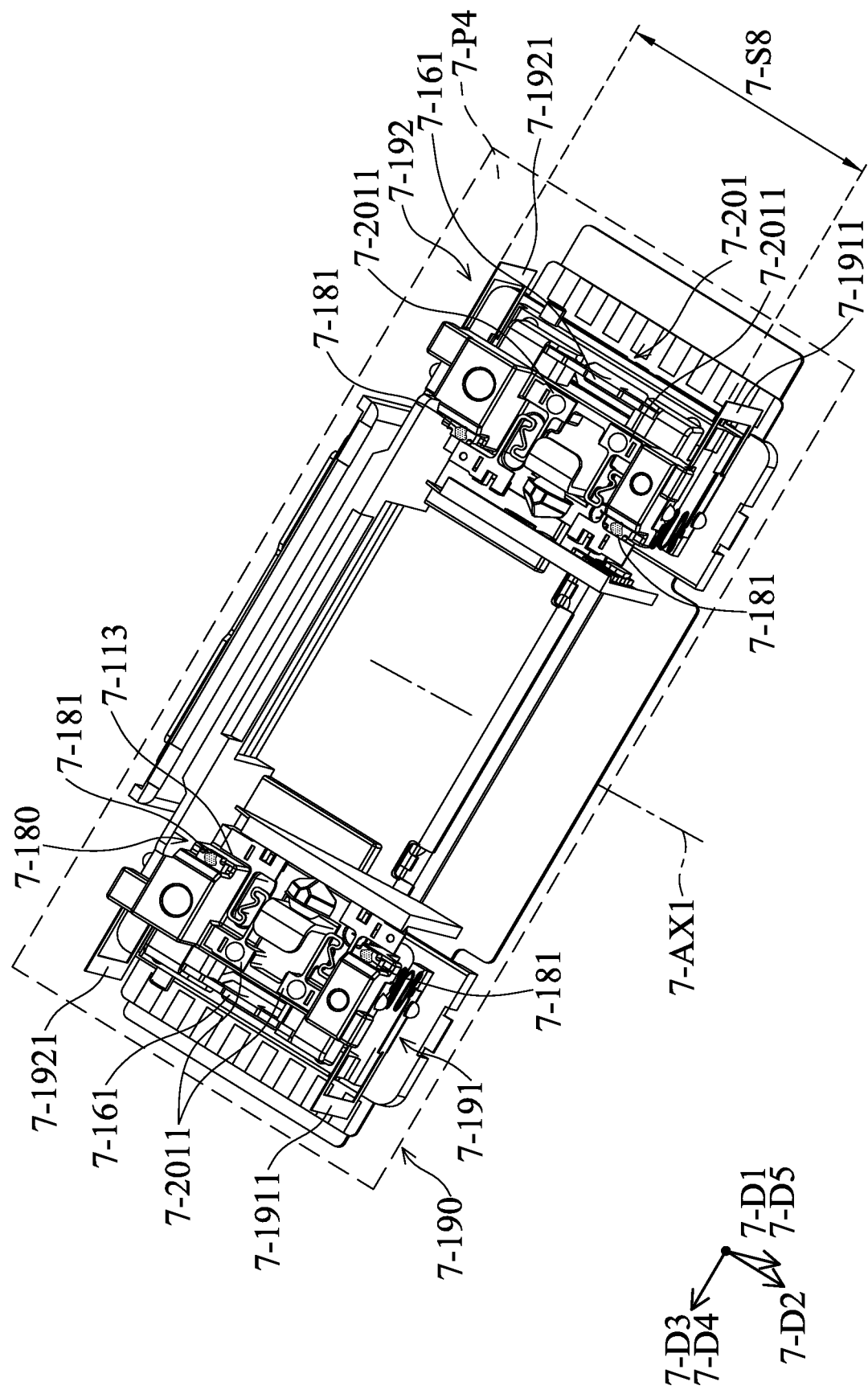
FIG. 13 shows a schematic view of second supporting assembly, a second suppression assembly, a first connecting assembly and a second connecting assembly of the optical element driving mechanism according to an embodiment of the present disclosure.

Please refer to FIG. 13, the second suppression assembly 7-180 suppresses an abnormal movement or vibration of the holder 7-121 relative to the frame 7-113, so as to improve the driving accuracy. The second damping element 7-181 of the second suppression assembly 7-180 has a soft resin material. The second damping element 7-181 is in direct contact with the holder 7-121 (not shown) and the frame 7-113. The second damping elements 7-181 are respectively located at different corners of the fixed part 7-110 when viewed along a first direction. A fourth imaginary plane 7-P4 passes through the second damping element 7-181. The fourth imaginary plane 7-P4 is perpendicular to the first direction 7-D1.

Please refer to FIG. 9 and FIG. 13, the holder 7-121 is movable relative to the frame 7-113 within the second limit range in the second dimension via the second supporting assembly 7-160. The second supporting units 7-161 of the second supporting assembly 7-160 are arranged in a direction that is parallel to an extending direction of the second side 7-115 (may be the third direction 7-D3) when viewed along the first direction 7-D1. The first elastic element 7-191 has a plate-like structure. The second elastic element 7-192 having a plate-like structure.

The frame 7-113 is movably connected to the fixed part 7-110 via the first connecting assembly 7-190. A thickness direction of the first elastic element 7-191 is perpendicular to the third direction 7-D3. The first elastic element 7-191 is parallel to the first rotary axis 7-AX1. The first elastic element 7-191 includes a plurality of first elastic units 7-1911. The first elastic units 7-1911 are arranged along the fourth direction 7-D4. The second side 7-115 is parallel to the fourth direction 7-D4.

A thickness direction of the second elastic element 7-192 is perpendicular to the third direction 7-D3. The second elastic element 7-192 is parallel to the first rotary axis 7-AX1. The second elastic element 7-192 further includes a plurality of second elastic units 7-1921. The second elastic units 7-1921 are arranged along the fourth direction 7-D4.

In the third direction 7-D3, a non-zero distance 7-S8 is provided between the first elastic element 7-191 and the second elastic element 7-192.

The holder 7-121 (not shown in FIG. 13) is movably connected to the frame 7-113 via the second connecting assembly 7-200. The third elastic element 7-201 has a plate-like structure. A thickness direction of the third elastic element 7-201 is perpendicular to a fifth direction 7-D5. The third elastic element 7-201 is not parallel to the first rotary axis 7-AX1. The third elastic element 7-201 is perpendicular to the first rotary axis 7-AX1. The third elastic element 7-201 further includes a plurality of third elastic units

7-2011. The third elastic units 7-2011 are arranged along the fourth direction 7-D4. The third elastic element 7-201 is located between the first elastic element 7-191 and the second elastic element 7-192 when viewed along the first direction 7-D1.

In summary, the movable part 7-120 of the optical element driving mechanism 7-10 of the present disclosure is movable relative to the fixed part 7-110 via the first supporting assembly 7-150 and the second supporting assembly 7-160. In this way, the movable part 7-120 and the optical element 7-O is movable relative to the fixed part 7-110 more smoothly. Moreover, a better imaging effect may be achieved by driving the optical element 7-O. Furthermore, since the first supporting assembly 7-150 and the second supporting assembly 7-160 have spherical structures, the first supporting assembly 7-150 and the second supporting assembly 7-160 of the optical element driving mechanism 7-10 may be minimized, thereby achieving the effect of miniaturizing the optical element driving mechanism 7-10.

Although embodiments of the present disclosure and their advantages have been described in detail, it should be understood that various changes, substitutions and alterations may be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. An optical element driving mechanism, comprising:
    a fixed part;
    a movable part, connected to an optical element, and movable relative to the fixed part;
    a first driving assembly, driving the movable part to move relative to the fixed part; and
    a first supporting assembly;
    wherein the movable part being movable relative to the fixed part within a first limit range in a first dimension via the first supporting assembly,
    wherein the first dimension is a rotation about a first rotary axis,
    wherein the first supporting assembly comprises:
    a first intermediate element, located between the fixed part and the movable part;
    a second intermediate element, located between the fixed part and the movable part;
    wherein the first intermediate element has a spherical structure,
    wherein the fixed part or the movable part is movable relative to the first intermediate element,
    wherein the first rotary axis passes through the first intermediate element,
    wherein the second intermediate element has a spherical structure,
    wherein the second intermediate element is movable relative to the first intermediate element,
    wherein a shortest distance between the second intermediate element and the first rotary axis is different from a shortest distance between the first intermediate element and the first rotary axis.

2. The optical element driving mechanism as claimed in claim 1, wherein the optical element changes a traveling direction of an optical axis of a light from a first direction to a second direction,
    wherein the first direction is not parallel to the second direction,
    wherein the first supporting assembly further comprises:
    a third intermediate element, located between the fixed part and the movable part;
    a fourth intermediate element, located between the fixed part and the movable part;
    a first supporting element, in direct contact with the first intermediate element, and comprising a first base bottom;
    a first bearing unit, corresponding to the first intermediate element, and comprising a first opening;
    a first strengthening unit, disposed on the first base bottom, and comprising a second surface;
    a first accommodating unit, disposed on the first base bottom, and comprising a third surface;
    a second supporting element, in direct contact with the first intermediate element, and comprising a second base bottom;
    a second strengthening unit, disposed on the first base bottom, and comprising a fifth surface; and
    a second accommodating unit, disposed on the first base bottom, and comprising a sixth surface,
    wherein the first intermediate element has a metal material,
    wherein the second intermediate element has metal material,
    wherein the fixed part or the movable part is movable relative to the second intermediate element,
    wherein the second intermediate element is movable relative to the fixed part,
    wherein the second intermediate element is movable relative to the movable part,
    wherein the shortest distance between the second intermediate element and the first rotary axis is greater than the shortest distance between the first intermediate element and the first rotary axis,
    wherein the fixed part or the movable part is movable relative to the third intermediate element,
    wherein the third intermediate element is movable relative to the first intermediate element,
    wherein a shortest distance between the third intermediate element and the first rotary axis is different from the shortest distance between the first intermediate element and the first rotary axis,
    wherein the shortest distance between the third intermediate element and the first rotary axis is greater than the shortest distance between the first intermediate element and the first rotary axis, wherein the shortest distance between the third intermediate element and the first rotary axis 1s substantially equal to the shortest distance between the second intermediate element and the first rotary axis, wherein the fixed part or the movable part is movable relative to the fourth intermediate element, wherein the fourth intermediate element is movable relative to the first intermediate element.

3. The optical element driving mechanism as claimed in claim 2, wherein a shortest distance between the fourth intermediate element and the first rotary axis is different from the shortest distance between the first intermediate element and the first rotary axis, wherein the shortest distance between the fourth intermediate element and the first rotary axis is greater than the shortest distance between the first intermediate element and the first rotary axis, wherein the shortest distance between the fourth intermediate element and the first rotary axis 1s substantially equal to the shortest distance between the second intermediate element and the first rotary axis, wherein the first rotary axis passes through a triangle formed by the second intermediate element, the third intermediate element and the fourth intermediate element when viewed along the first rotary axis, wherein a first imaginary plane passing through the second intermediate element, the third intermediate element and the fourth intermediate element, wherein the first imaginary plane passes through the first intermediate element, wherein in the direction that is parallel to the second rotary axis, a distance between a center of the fourth intermediate element and a central of the third intermediate element is about zero.

4. The optical element driving mechanism as claimed in claim 3, wherein the first supporting element is in direct contact with the second intermediate element, wherein the first base bottom has a first surface, and the first surface overlaps and is parallel to a second imaginary plane, wherein the first surface faces toward the first intermediate element, wherein the first base bottom has a plastic material, wherein the first opening accommodates at least part of the first intermediate element, wherein an edge of the first opening has a first reinforcing structure, the first reinforcing structure is in direct contact with the first intermediate element, wherein the first reinforcing structure has an arc structure or an inclined structure that is not parallel and not perpendicular to the first surface, wherein the first bearing unit protrudes from the first surface, wherein the first intermediate element is fixedly connected to the first bearing unit.

5. The optical element driving mechanism as claimed in claim 4, wherein the second surface faces toward the second intermediate element, wherein the Young's modulus of the first strengthening unit is different from the Young's modulus of the first base bottom, wherein the first strengthening unit has a metal material, wherein the second surface is parallel to the second imaginary plane, wherein the second surface overlaps the second imaginary plane, wherein the second intermediate element does not overlap the second surface when viewed along the direction that is perpendicular to the first rotary axis, wherein the second intermediate element at least partially overlaps the second surface when viewed along the direction that is parallel to the first rotary axis, wherein a non-zero distance is provided between the second intermediate element and the second surface.

6. The optical element driving mechanism as claimed in claim 5, wherein the third surface faces toward the second intermediate element, wherein the Young's modulus of the first accommodating unit is different from the Young's modulus of the first base bottom, wherein the first accommodating unit has a metal material, wherein the first accommodating unit has a second opening for receiving at least part of the second intermediate element, wherein the second opening does not accommodate the third intermediate element and the fourth intermediate element, wherein the second opening is located on the third surface, wherein an edge of the second opening has a second reinforcing structure, and the second reinforcing structure is in direct contact with the second intermediate element, wherein the second reinforcing structure has an arc structure or an inclined structure that is not parallel and not perpendicular to the third surface, wherein the second intermediate element at least partially overlaps the third surface when viewed along the direction that is perpendicular to the first rotary axis, wherein the second intermediate element at least partially overlaps the third surface when viewed along the direction that is parallel to the first rotary axis, wherein the second supporting element is in direct contact with the second intermediate element.

7. The optical element driving mechanism as claimed in claim 6, wherein the first intermediate element is located between the first supporting element and the second supporting element when viewed along the direction that is perpendicular to the first rotary axis, wherein the second intermediate element is located between the first supporting element and the second supporting element when viewed along the direction that is perpendicular to the first rotary axis.

8. The optical element driving mechanism as claimed in claim 7, wherein the second base bottom has a fourth surface that is parallel to a third imaginary plane, wherein the direction in which the fourth surface faces is the same as the direction in which the first surface faces, wherein the second base bottom further comprises a first accommodating portion to receive at least part of the second intermediate element, wherein the first accommodating portion does not directly contact the second intermediate element, wherein the second base bottom further comprises a second accommodating portion to receive at least a portion of the second intermediate element, wherein the second accommodating portion does not directly contact the second intermediate element, wherein the second base bottom has a plastic material.

9. The optical element driving mechanism as claimed in claim 8, wherein the fifth surface faces toward the second intermediate element,
wherein the Young's modulus of the second strengthening unit is different from the Young's modulus of the second base bottom,
wherein the second strengthening unit further comprises second bearing unit for accommodating at least part of the first intermediate element,
wherein the second bearing unit accommodates at least part of the first intermediate element,
wherein the second bearing unit has a recessed structure.

10. The optical element driving mechanism as claimed in claim 9, wherein the first intermediate element is movable relative to the second bearing unit,
wherein the second bearing unit is located on the fifth surface,
wherein the first intermediate element at least partially overlaps the fifth surface when viewed along the direction that is perpendicular to the first rotary axis,
wherein the first intermediate element at least partially overlaps the fifth surface when viewed along the direction that is parallel to the first rotary axis,
wherein the second intermediate element does not overlap the fifth surface when viewed along the direction that is perpendicular to the first rotary axis,
wherein the second intermediate element at least partially overlaps the fifth surface when viewed along the direction that is parallel to the first rotary axis,
wherein a non-zero distance is provided between the second intermediate element and the second surface,
wherein the sixth surface faces toward the second intermediate element.

11. The optical element driving mechanism as claimed in claim 10, wherein the second accommodating unit is disposed on the fourth surface,
wherein the Young's modulus of the second accommodating unit is different from the Young's modulus of the first base bottom,
wherein the second accommodating unit has a metal material,
wherein the second accommodating unit has a third opening for receiving at least part of the second intermediate element,
wherein the third opening accommodates at least part of the third intermediate element,
wherein the third opening accommodates at least part of the fourth intermediate element,
wherein the third opening is located on the sixth surface,
wherein an edge of the third opening has a third reinforcing structure, and the third reinforcing structure is in direct contact with the second intermediate element,
wherein the third reinforcing structure has an arc structure or an inclined structure that is not parallel and not perpendicular to the sixth surface,
wherein the second intermediate element at least partially overlaps the sixth surface when viewed along the direction that is perpendicular to the first rotary axis,
wherein the second intermediate element at least partially overlaps the sixth surface when viewed along the direction that is parallel to the first rotary axis.

12. The optical element driving mechanism as claimed in claim 1, further comprising a first suppression assembly, suppressing an abnormal movement or vibration of the movable part relative to the fixed part to improve the driving accuracy, and the first suppression assembly comprising:
a first suppression element;
a second suppression element, corresponding to the first suppression element; and
a first damping element, disposed between the first damping element and the second damping element,
wherein the Young's modulus of the first suppression element is different from the Young's modulus of the second suppression element,
wherein the first suppression element has a metal material,
wherein the second suppression element has a plastic material,
wherein the first suppression element and the second suppression element are respectively disposed on the movable part and the fixed part,
wherein the first suppression element has a protruding structure extending toward the second suppression element,
wherein the second suppression element has recessed structure accommodating at least part of the first suppression element,
wherein the first damping element has a soft resin material.

13. The optical element driving mechanism as claimed in claim 12, wherein in an extending direction of the protruding structure of the first suppression element, a maximum dimension of the first suppression element is smaller than a depth of the recessed structure of the second damping element,
wherein the first damping element is in direct contact with the first suppression element and the second suppression element,
wherein the first suppression element does not directly contact the second element suppression when the movable part is located at an arbitrary position within the first limit range,
wherein the fixed part has a rectangular structure and the first suppression element is located on a first side of the fixed part when viewed along the extending direction of the protruding structure of the first suppression element.

14. The optical element driving mechanism as claimed in claim 13, wherein the fixed part has a second side, and the second side is not parallel to the first side when viewed along the extending direction of the protruding structure of the first suppression element,
wherein a length of the first side is different from a length of the second side,
wherein the length of the first side is shorter than the length of the second side.

15. The optical element driving mechanism as claimed in claim 14, further comprising a second driving assembly,
wherein the movable part comprises a holder and a frame,
wherein the second driving assembly drives the holder to move relative to the frame,
wherein the protruding structure of the first suppression element extends along the first direction,
wherein the first driving assembly is located at the first side when viewed along the first direction,
wherein the second driving assembly is located at the second when viewed along the first direction,
wherein the first driving assembly comprises:
a first coil, having a first section; and
a first magnetic element, corresponding to the first section to generate a first driving force, wherein the second driving assembly comprises:
a second coil, having a second section; and
a second magnetic element, corresponding to the second section to generate a second driving force,
wherein the directions of the first driving force and the second driving force are different,
wherein the extending directions of the first section and the second section are parallel to each other,
wherein an arranging direction of the first coil and the first magnetic element is different from an arranging direction of the second coil and the second magnetic element,
wherein a winding axis of the first coil is not parallel to a winding axis of the second coil.

16. The optical element driving mechanism as claimed in claim 1, further comprising a second suppression assembly,
wherein the movable part comprises a holder and a frame,
wherein the second suppression assembly suppresses an abnormal movement or vibration of the holder relative to the frame to improve the driving accuracy,
wherein the second suppression assembly comprises a plurality of second damping elements,
wherein the second damping elements have a soft resin material,
wherein the second damping elements are in direct contact with the holder and the frame,
wherein the second damping elements are respectively located at different corners of the fixed part when viewed along a first direction,
wherein a fourth imaginary plane passes through the second damping elements,
wherein the fourth imaginary plane is perpendicular to the first direction.

17. The optical element driving mechanism as claimed in claim 1, further comprising a second supporting assembly,
wherein the movable part comprises a holder and a frame,
wherein the holder is movable relative to the frame within the second limit range in the second dimension via the second supporting assembly,
wherein the first dimension is different from the second dimension,
wherein the second dimension is a rotation about a second rotary axis,
wherein the first rotary axis is not parallel to the second rotary axis,
wherein the second supporting assembly has a plurality of second supporting units, and the second supporting units are arranged in a direction that is parallel to an extending direction of the second side.

18. The optical element driving mechanism as claimed in claim 1, further comprising a first connecting assembly,
wherein the movable part comprises a frame,
wherein the first connecting assembly comprises:
a first elastic element, having a plate-like structure; and
a second elastic element, having a plate-like structure,
wherein the frame is movably connected to the fixed part via the first connecting assembly,
wherein a thickness direction of the first elastic element is perpendicular to a third direction,
wherein the first elastic element is parallel to the first rotary axis,
wherein the first elastic element comprises a plurality of first elastic units, and the first elastic units are arranged along a fourth direction,
wherein the second side is parallel to the fourth direction,
wherein a thickness direction of the second elastic element is perpendicular to the third direction,
wherein the second elastic element is parallel to the first rotary axis,
wherein the second elastic element further comprises a plurality of second elastic units, and second elastic units are arranged along the fourth direction,
wherein in the third direction, a non-zero distance is provided between the first elastic element and the second elastic element.

19. The optical element driving mechanism as claimed in claim 18, further comprising a second connecting assembly,
wherein the holder is movably connected to the frame via the second connecting assembly, and the second connecting assembly comprises:
a third elastic element, having a plate-like structure,
wherein a thickness direction of the third elastic element is perpendicular to a fifth direction,
wherein the third elastic element is not parallel to the first rotary axis,
wherein the third elastic element is perpendicular to the first rotary axis,
wherein the third elastic element further comprises a plurality of third elastic units, and the third elastic units are arranged along the fourth direction.

20. The optical element driving mechanism as claimed in claim 9, wherein the third elastic element is located between the first elastic element and the second elastic element when viewed along the first direction.

* * * * *